United States Patent [19]

Miller

[11] 4,451,341

[45] May 29, 1984

[54] ELECTROLYTIC WATER STERILIZATION SYSTEM

[75] Inventor: Jeorge Miller, Bogota, Colombia

[73] Assignee: Hidrotronic de Colombia, S.A., Colombia

[21] Appl. No.: 454,499

[22] Filed: Dec. 29, 1982

[51] Int. Cl.$^3$ .............................................. C02F 1/46
[52] U.S. Cl. ................................... 204/149; 204/152; 204/229; 204/306
[58] Field of Search ............... 204/149, 151, 152, 306, 204/229, 228

[56] References Cited

U.S. PATENT DOCUMENTS

| | | | |
|---|---|---|---|
| 2,046,467 | 7/1936 | Krause | 204/149 |
| 3,135,674 | 6/1964 | Ruetschi | 204/151 |
| 3,528,905 | 3/1968 | Miller | 204/149 |
| 3,923,632 | 12/1975 | Eibl et al. | 204/149 |
| 3,936,364 | 2/1976 | Middle | 204/149 |
| 3,966,571 | 6/1976 | Gagnon et al. | 204/152 |
| 4,048,032 | 9/1977 | Eibl | 204/149 |
| 4,098,660 | 7/1978 | Eibl et al. | 204/149 |

FOREIGN PATENT DOCUMENTS 714038  7/1965  Canada ................................ 204/149

OTHER PUBLICATIONS

Nordell, E., *Water Treatment*, Reinhold Publishing Corp., London, 2nd Edition, 1961, pp. 348-389.

*Primary Examiner*—John F. Niebling
*Assistant Examiner*—B. J. Boggs, Jr.
*Attorney, Agent, or Firm*—Scully, Scott, Murphy & Presser

[57] ABSTRACT

An electrolytic water sterilization system comprises a rate detecting cell, an oxidation cell and a silvering cell through which the water flows. The rate detecting cell is fitted with two electrodes and is partly filled with non-conducting particles whose density is greater than water. The upwards flow of water expands the bed of particles providing greater free area between the electrodes. The electrical resistance between the electrodes is reduced accordingly. The current to the electrodes of the oxidation cell and the silvering cell is controlled by the detected flow rate. Preferably, the rate detecting cell, the oxidation cell and the silvering cell with their corresponding electrodes are combined in one single cell.

12 Claims, 3 Drawing Figures

ELECTROLYTIC WATER STERILIZATION SYSTEM

This invention relates to an electrolytic water sterilization system. In most cities with old water networks, a closure of a main for repair causes a vacuum which can suck polluted water into the water main, especially when leaking sewage mains are located near leaking water mains. In most civilized cities, chlorination plants are located at strategic points to rechlorinate the water. But, they are not always effective because they allow the reinfection of the water network, particularly with chloro-resistant patogenic micro organisms.

Further, many consumers of water get their water from other sources than the aqueduct. Also, in these cases, the water has to be sterilized thoroughly before use.

Objects and Summary of the Invention

It is an object of this invention to provide a novel electrolytic water sterilization system which is reliable without great expenditure on installation.

It is a further object of this invention to provide a process for electrolytic water sterilization which works reliably and needs little or no maintenance.

These and other objects of this invention are attained by a novel electrolytic water sterilization system.

This system comprises a rate detecing cell with electrodes to detect the flow through. It comprises further an oxidation cell comprising electrodes for the production of oxidizing material and a silvering cell comprising electrodes for the production of silver ions. A pipe connects a water source with the rate detecting cell, the oxidation cell, the silvering cell and the outlet for the sterilized water.

Preferably, the rate detecting cell comprises sensing electrodes connected to an electronic control which is connected to the oxidation cell and the silvering cell.

In a further preferred embodiment, the rate detecting cell, the oxidation cell and the silvering cell are combined in the form of one single cell.

In a preferred embodiment of the invention, the electronic control comprises a Wheatsone bridge connected to an electronic circuit which controls current to the electrodes of the oxidation cell and the silvering cell.

The invention is further directed to a process for electrolytic water sterilization in which flowing water is electrolytically oxidized and silvered, with the flow rate of the water being detected by rate detecting electrodes and with the electrolytic oxidation and silvering being controlled in accordance with the flow rate.

Preferably, the flow rate of the water is detected by detecting the resistance between the electrodes in a bed of particles in the stream of water. With changing flow rate the concentration of the particles is changed, thereby changing the resistance being detected by the electrodes.

DETAILED DESCRIPTION OF THE INVENTION

Figure 1:
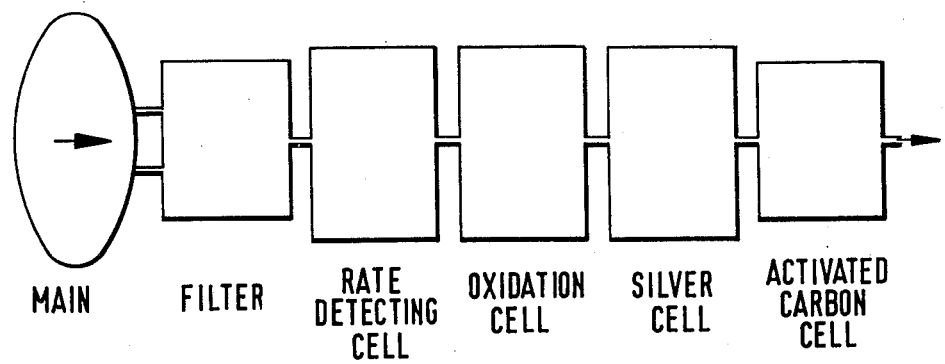
FIG. 1 is a diagram representing a preferred embodiment of the new electrolytic water sterilization system. The rate detecting cell, the oxidation cell and the silvering cell are combined in one single cell.

The main steps taken to sterilize the water are shown in FIG. 1. Water from the main flows through a filter to eliminate suspended solids. It then flows through a rate detecting cell which determines how much oxidation and silvering is required to sterilize the water. This cell forms the heart of the invention. It consists of a container through which water flows upwards and which is partly filled with non-conducting particles whose density is greater than water. Two electrodes are placed in the container; the non-conducting particles are at least partly placed between these electrodes. The rate of water flowing upwards expands the bed of particles, providing greater free area between the electrodes and a reduction of electrical resistance between the electrodes.

The decrease in resistance is a measure of the rate of flow of the water being used, and it is used to control the current flowing to the oxidation cell and the silvering cell. Water next flows through an oxidation cell and a silvering cell. The oxidation cell comprises electrodes where at the anode, active oxygen, chlorine and/or other oxidizing materials are produced, depending on the composition of the water, which for example may contain oxygen, chlorine from a chlorination station and impurities.

The silvering cell comprises silver electrodes which dissolve the anode, producing silver ions in direct proportion to the water flow.

Water next flows through a container filled with activated carbon particles, which are previously treated with silver salts to coat them with colloidal silver. This container acts like a buffer. In case the electric current is temporarily cut off, the silver in the activated carbon serves as oxidizing material for the sulfides; further, the colloidal silver provides the sterilization of the water. As soon as the electric current is re-established, the oxidation material, provided in the oxidation cell, reoxidises the silver sulfides formed in the activated carbon and re-establishes its buffer capacity.

Figure 2:
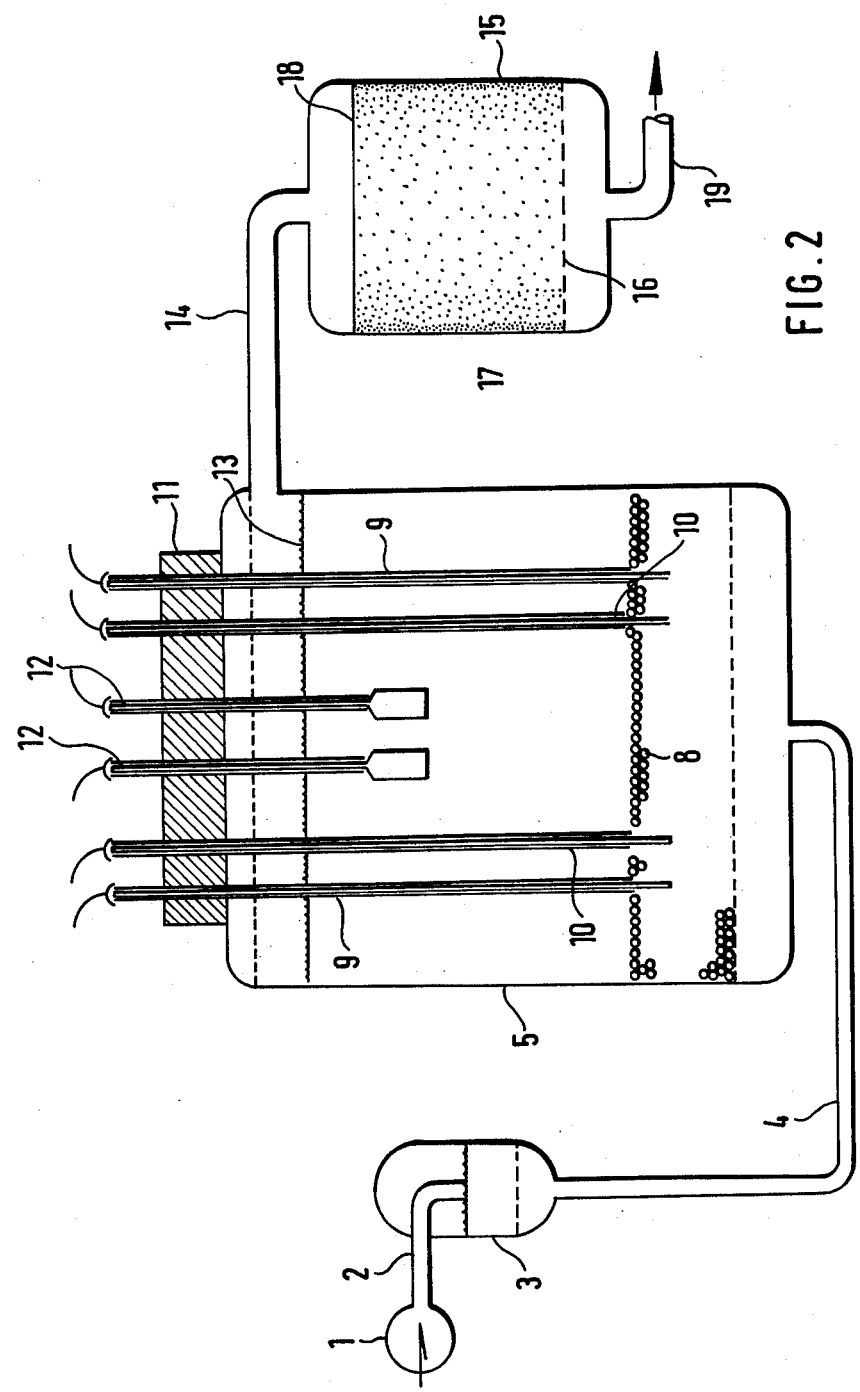
FIG. 2 is a view, partly in section, of a further preferred embodiment of the new electronic water sterilization system showing the rate detecting cell, the oxidation cell and the silvering cell combined in one single cell.

A preferred form of the new electrolytic water sterilization system for use in private houses, hotels, buildings and hospitals, where the use of water varies practically every minute, is shown in FIG. 2.

Water flows from the main pipe through pipe 2, through filter 3, through pipe 4 to the bottom of combination cell 5. In this combined cell, which is a combination of the rate detecting cell, the oxidation cell and the silvering cell, water flows upward through screen 7, which supports particles 8 and which serves simultaneously as distributor. The density of particles 8 is greater than that of water. The bed of particles 8 covers at least the lower uninsulated parts of sensor electrodes 9 and silver electrodes 10. Electrodes 9 and 10 are electrically insulated above level of particles 8 bed and extend through stopper 11.

Platinum electrodes 12, placed above bed of particles 8, are connected by isolated connections 12 through stopper 11. Of course platinum electrodes are at least partially submerged into the water. Screen 13 prevents particles 8 from leaving cell 5.

Pipe outlet 14 leads the water from cell 5 to container 15. Screen 16 supports carbon particles 17, and screen 18 prevents carbon particles 17 from leaving container 15 when during back washing. Pipe 19 delivers sterilized water from the underside of screen 18.

Figure 3:
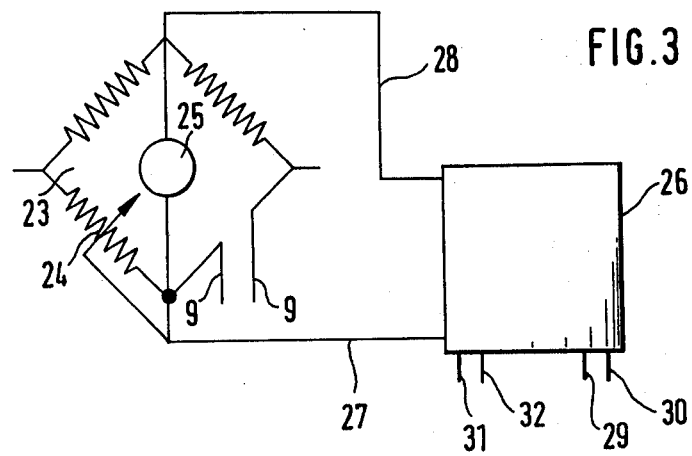
FIG. 3 is a diagram of the electronic circuit which shows the control of the electrodes in the oxidation cell and the silvering cell by the rate detecting electrodes.

FIG. 3 shows the electrical circuit for the electronic control of the electrodes of cell 5. Sensing electrodes 9 are connected to and form a leg of a Wheatstone bridge 23 which has a potentiometer 24 in another leg of bridge 23. Ammeter 25 serves to show zero current flow when the bridge is balanced. The electronic circuit of control 26, not shown in detail, receives signals from bridge 23 through connections 27 and 28, and it controls current to electrodes 10 through the connectors 29 and 30 and to electrodes 12 through the connectors 31 and 32.

To place the equipment in operation it is filled first with water which is to be treated and potentiometer 25 is adjusted until the ammeter reads zero. Water then is allowed to flow through the equipment. The flow of water expands the fluid bed of particles 8, decreasing the resistance between sensing electrodes 9. The adjustment to zero is essential not only to determine zero flow but also to determine the relative ionic pollution of the water.

The imbalance in bridge 23, due to the change of resistance between sensing electrodes 9, is proportional to the rate of water flow. The electronic control 26 analyzes the signal and sends direct current to silver electrodes 10 which dissolve the anode thereby producing silver ions in direct proportion to the water flow. The elctronic control 26 also sends current to platinum electrodes 12 where, depending on the impurities in water, active oxygen, chlorine and/or other oxidising materials are produced at the anode. This current is also proportional to water flow. The concentration of silver ions is very low. For a complete sterilization, a silver concentration in the order of one part per hundred millions parts of water or 1 to 12 gammas per liter of water are sufficient. The oxidation concentration should be greater than one part per million part of free oxygen dissolved in the water.

Once the water is oxidized and silvered, it is then passed through the silvered activated carbon which absorbs any excessive silver and which filters and destroys, through the oligodynamic process of finely divided silver, any microbe that may have been encased in the colloidal matter.

In case of power failure, enough silver in the carbon filter should be present to oxidize sulfides and provide enough residual active silver to kill all micro-organisms. For the consumption of the average house, which needs 2 cubic meters of water daily, the amount of silver absorbed in the carbon should be about 10 grams, and the volume of activated carbon should be 3 liters. Under normal condition, the power can be cut off safely for 30 days.

In cases where the water comes from sources other than from the aqueduct, a fourth set of electrodes, made of aluminum or iron, can be placed in front of the filter to produce aluminum or iron hydroxides. Upon flocculation, these hydroxides absorb all suspended materials which are then taken up by the filter. The same electronic control can send the appropriate current to these electrodes in proportion to the water flow, ensuring that as the filter is progressively blocked and the water flow diminished, the required amount of flocs are provided proportional to the water flow.

I claim:

1. Electrolytic water sterilization system comprising: a flow rate detecting cell comprising a plurality of electrodes having nonconducting particles situated therebetween for detecting the flow rate of water through the cell in an arrangement wherein the flowing water expands the volume of the nonconducting particles which results in a reduction of the electrical resistance between the electrodes, an oxidation cell comprising electrodes for the production of oxidizing material, a silvering cell comprising electrodes for the production of silver ions, and a pipe connecting a source for the water with the rate detecting cell, the oxidation cell, the silvering cell and the outlet for the sterilized water.

2. Electrolytic water sterilization system according to claim 1, characterized in the electrodes for the production of oxidized material being platinum electrodes and the electrodes for the production of silver ions being silver electrodes.

3. Electrolytic water sterilization system according to claim 1, characterized in the rate detecting cell comprising sensing electrodes connected to an electronic control which is connected to the oxidation cell and the silvering cell.

4. Electrolytic water sterilization system according to claim 1, characterized by a combined cell which is a combination of the rate detecting cell, the oxidation cell and the silvering cell in one single cell.

5. Electrolytic water sterilization system according to any of claims 1-4 characterized by a cell containing activated carbon which is arranged between the silvering cell and the outlet for the sterilized water.

6. Electrolytic water sterilization system according to claim 5, characterized by the activated carbon being coated with colloidal silver.

7. Electrolytic water sterilization system according to any of claim 1, characterized by a filter placed ahead of the rate detecting cell.

8. Electrolytic water sterilization system according to claim 3, characterized in the electronic control comprises a Wheatstone bridge connected to an electronic circuit which controls current to the electrodes of the oxidation cell and of the silvering cell, said Wheatstone bridge being responsive to a change in the resistance in the electrodes caused by the movement of the nonconducting particles.

9. Electrolytic water sterilization system according to claim 1, characterized by a bed of particles filling only part of the rate detecting cell and covering the lower ends of the electrodes of the rate detecting cell.

10. Electrolytic water sterilization system according to claim 1, comprising further electrodes provided ahead of the filter which produce metal hydroxides, which on flocculating absorb material suspended in the water.

11. A process for electrolytic water sterilization comprising electrolytic oxidation and silvering of flowing water, the flow rate of the water being detected by a flow rate detecting cell comprising a plurality of electrodes having nonconducting particles situated therebetween for detecting the flow rate of water in an arrangement wherein the flowing water expands the volume of the nonconducting particles which results in a reduction of the electrical resistance between the electrodes and the electrolytic oxidation and silvering being controlled in accordance with the flow rate of the water.

12. A process according to claim 11, characterized in the silvering being performed by colloidal silver on activated carbon in case the electric current is temporarily cut off.

* * * * *